United States Patent
Cao et al.

(10) Patent No.: US 8,325,192 B2
(45) Date of Patent: Dec. 4, 2012

(54) CREATING ANIMATIONS

(75) Inventors: Xiang Cao, Cambridge (GB); John Helmes, Cambridge (GB); Abigail Sellen, Cambridge (GB); Sian Elizabeth Lindley, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 12/501,072

(22) Filed: Jul. 10, 2009

(65) Prior Publication Data

US 2011/0007078 A1 Jan. 13, 2011

(51) Int. Cl.
*G06T 13/00* (2011.01)
*G03B 17/02* (2006.01)
*G03B 11/00* (2006.01)

(52) U.S. Cl. ......... 345/473; 396/535; 396/537; 396/545

(58) Field of Classification Search ................ 396/545, 396/537, 534
See application file for complete search history.

(56) References Cited

U.S. PATENT DOCUMENTS

| | | | | |
|---|---|---|---|---|
| 5,748,326 | A | * | 5/1998 | Thompson-Bell et al. ... 358/296 |
| 5,752,089 | A | * | 5/1998 | Miyazawa et al. ............. 396/48 |
| 6,166,744 | A | * | 12/2000 | Jaszlics et al. ................ 345/629 |
| 6,173,119 | B1 | * | 1/2001 | Manico et al. .................... 396/6 |
| 6,976,229 | B1 | | 12/2005 | Balabanovic et al. |
| 7,474,983 | B2 | | 1/2009 | Mazalek et al. |
| 7,511,703 | B2 | | 3/2009 | Wilson et al. |
| 7,528,868 | B2 | * | 5/2009 | Perotti et al. ............... 348/231.3 |
| 7,561,786 | B1 | * | 7/2009 | Black ............................. 396/57 |
| 2006/0221083 | A1 | * | 10/2006 | Guitarte Perez et al. ..... 345/473 |

OTHER PUBLICATIONS

Labrune et al.,Tangicam: Exploring Observation Tools for Children; Proceedings of the 2005 Conference on Interaction Design and Children, IDC 2005; ACM 2005.*
Barnes et al.; Video Puppetry: A Performative Interface for Cutout Animation; ACM Transcations on Graphics (TCM)—Proceedings of ACM SIGGRAPH Asia 2008, vol. 27 Issue 5, Dec. 2008.*
Amazon; Alzo Transformer DSLR Rig: Camera & Photo; available at http://www.amazon.com/Alzo-Digital-ALZO-Transformer-DSLR/dp/B00558BXS0/ref=sr_1_3?s=photo&ie=UTF8&qid=1332562291&sr=1-3; retrieved Mar. 24, 2012.*
Amazon; Bushnell Sportview 20-60×60mm Spotting Scope; available at http://www.amazon.com/Bushnell-Sportview-20-60×60mm-Spotting-Scope/dp/B0000A0AIQ/ref=sr_1_43?ie=UTF8&qid=1332562999&sr=8-43; retrieved Mar. 24, 2012.*

(Continued)

*Primary Examiner* — Kee M Tung
*Assistant Examiner* — Carlos Perromat
(74) *Attorney, Agent, or Firm* — Lee & Hayes, PLLC

(57) ABSTRACT

Animation creation is described, for example, to enable children to create, record and play back stories. In an embodiment, one or more children are able to create animation components such as characters and backgrounds using a multi-touch panel display together with an image capture device. For example, a graphical user interface is provided at the multi-touch panel display to enable the animation components to be edited. In an example, children narrate a story whilst manipulating animation components using the multi-touch display panel and the sound and visual display is recorded. In embodiments image analysis is carried out automatically and used to autonomously modify story components during a narration. In examples, various types of handheld view-finding frames are provided for use with the image capture device. In embodiments saved stories can be restored from memory and retold from any point with different manipulations and narration.

18 Claims, 19 Drawing Sheets

OTHER PUBLICATIONS

Amazon; Rode VideoMic Directional Video Condenser Microphone w/Mount; available at http://www.amazon.com/Rode-VideoMic-Directional-Condenser-Microphone/dp/B0007U9SOC/ref=pd_cp_p_2; retrieved Mar. 24, 2012.*

Amazon; Delkin Devices DDMOUNT-MINI Fat Gecko Double Knuckle Single Suction Cup Camera Mount; available at http://www.amazon.com/Delkin-Devices-DDMOUNT-MINI-Knuckle-Suction/dp/B002K8Q0EU/ref=sr_1_2?s=electronics&ie=UTF8&qid=1332562612&sr=1-2; retrieved Mar. 24, 2012.*

"All Hands on the Table for Cyber Communication", retrieved on May 14, 2009 at <<http://www.smh.com.au/news/technology/all-hands-on-the-table-for-cyber-communication/2007/10/03/1191091193503.html>>, The Sydney Morning Herald, pp. 1-2.

Antle, "Case Study: The Design of CBC4Kids' StoryBuilder", IDS 2003, ACM, 2003, pp. 59-68.

Apted et al., "PhoTable: Enhancing the Social Interaction around the Sharing of Digital Photographs", School of Information Technologies, University of Sydney, 2006, pp. 1-pp. 3.

Apted et al., "Tabletop Sharing of Digital Photographs for the Elderly", The Proceedings of theh SIGCHI Conference on Human Factors in Computer Systems, Apr. 22-28, 2006, ACM, pp. 1-pp. 10.

Balabanovic et al., "Storytelling with Digital Photographs", Ricoh Silicon Valley, CHI 2000 Conference on Human Factors in Computer Systems, Apr. 2000, pp. 1-pp. 8.

Benford, et al., "Designing Storytelling Technologies to Encourage Collaboration between Young Children", CHI, 2000, pp. 556-563.

Brignull, "The Introduction of a Shared Interactive Surface into a Communal Space", CSCW 2004, ACM, 2004, pp. 49-58.

Budd, et al., "PageCraft: Learning in Context. A Tangible Interactive Storytelling Platform to Support Early Narrative Development for Young Children", IDC 2007 Proceedings: Tangible Interaction, ACM, 2007, pp. 97-100.

Cappelletti, et al., "Enforcing Cooperative Storytelling: First Studies", Proceedings of the 4th IEEE International Conference on Advanced Learning Technologies, ICALT 2004, 2004, pp. 281-285.

Cassell, et al., "Making Space for Voice: Technologies to Support Children's Fantasy and Stroytelling", Personal and Ubiquitous Computing, 2001, pp. 169-190.

Decortis, et al., "New Active Tools for Supporting Narrative Structures", Personal and Ubiquitous Computing, 2002, pp. 416-429.

Druin, "Designing PETS: A Personal Electronic Teller of Stories", CHI, 1999, pp. 326-329.

Engels, "The Stories Children Tell", Fostering Narrative Development, W.H. Freeman and Company, 1999, pp. 205-221.

Fontijin, et al., "StoryToy the Interactive Storytelling Toy", 3rd International Conference on Pervasive Computing, 2005, 6 pages.

Fusai, et al., "Media Composition and Narrative Performance at School", Journal of Computer Assisted Learning, Blackwell Publishing, 2003, pp. 177-185.

Glos, et al., "Rosebud: Technological Toys for Storytelling", CHI, 1997, pp. 359-360.

Hilliges, "Finding the Unknown—Serendipitous Discovery in Co-Located Consumption of Digital Photo Collections", University of Munich Medica Informatics Group, pp. 1-pp. 3.

Hourcade, et al., "Vuelta: Creating Animated Characters and Props Using Real-World Objects", CHI, Extended Abstracts, ACM, 2007, pp. 2429-2434.

Kelleher, et al., "Storytelling Alice Motivates Middle School Girls to Learn Computer Programming", CHI, 2007, pp. 1455-1465.

Makela, "Joking, Storytelling, Artsharing, Expressing Affection: A Field Trial of How Children and their Social Network Communicate with Digital Images in Leisure Time", CHI Letters, vol. 2, Issue 1, 2000, pp. 548-555.

Mazalekl et al., "The TViews Table for Storytelling and Gameplay", retrived at <<http://mf.media.mit.edu/pubs/journal/mazalek_pgbook2007_tviews.pdf>> on May 19, 2009, pp. 1-pp. 29.

Montemayor, et al., "Tools for Children to Create Physical Interactive StoryRooms", Computers in Entertainment, ACM, vol. 2, No. 1, 2004, pp. 1-24.

Raffle, "Jabberstamp: Embedding Sound and Voice in Traditional Drawings", IDC, 2007, 1 page.

Ryokai, et al., "I/O Brush: Drawing with Everyday Objects as Ink", Proceedings of CHI 2004, ACM Press, 2004, pp. 1-8.

Salovaara, "Appropriation of a MMS-based Comic Creator: From System Functionalities to Resources for Action", CHI, 2007, pp. 1117-1126.

Shen, "Multi-User Interface and Interactions on Direct-Touch Horizontal Surfaces: Collaborative Tabletop Research at MERL", retrieved on May 14, 2009 at <<http://ieeexplore.ieee.org/stamp/stamp.jsp?tp=&isnumber=33359&arnumber=1579190>>, Proceedings of the First IEEE International Workshop on Horizontal Interactive Human-Computer Systems (Tabletop 2006), IEEE, 2006, 2 pages.

Shen et al., "Personal Digital Historian: User Interface Design", Mitsubishi Resarch Laboratories, TR-2000-34, Jan. 2001, pp. 1-pp. 5.

Vaucelle, et al., "Picture This! Film Assembly Using Toy Gestures", International Conference on Ubiquitous Computing, UbiComp, ACM Press, 2008, pp. 350-360.

* cited by examiner

CREATING ANIMATIONS

BACKGROUND

Apparatus to create animations is required for many applications such as enabling children to create, record and play back their own stories; for designers to create story boards rapidly; for capturing ideas for feature films; and to enable adults to capture narrated stories about life events. For example, there is a huge potential for new educational and learning tools for children which enable them to create their own animations and/or tell stories either individually or working as a team.

There is much evidence from pedagogical literature that storytelling and fantasy play is an important part of the development of young children. Fantasy play is important for children's cognitive, linguistic, emotional and social development as well as developing collaboration and peer negotiation skills. Often stories are told by manipulating physical toys as story characters, narrating the story at the same time. However, many of today's computer implemented animation creation systems for children use computer-related technology but do not allow children to create animations using their imaginations and develop ideas in a child centered way, or in ways which encourage collaboration amongst children.

Some previous animation creation systems are known which let a user create digital stories with virtual characters and environments using a standard computer. The storyteller has some freedom in the creation of characters and storylines but children and other novice users need to be able to operate a standard computer. In addition, they must create all content on the computer from scratch and therefore cannot leverage the richness already existing in physical objects and environments.

Other systems track physical toys augmented with sensors and can record the movements of the toys as well as narrations to create a story. Systems are available that let the storyteller attach a video camera to different toys and create first person view scenarios augmented by voice narration. These types of systems are reliant on existing physical toys and this can limit the imagination and creative potential of the children or other users. Also, it is often difficult for children to attach cameras to existing physical toys. In addition, the resulting images are often difficult for children to interpret as they may not be taken from a view point that is understood or recognised by the child. Still further systems rely on physical proxy objects representing information added to a scenario. Using physical proxy objects in this way also limits the amount of creativity allowed and requires the child or other user to learn how to use and understand the effects of the proxy object.

Previous systems have had no or limited ability to enable users to work collaboratively in the creation of animations. This is particularly the case in systems designed for use by children who typically all want to join in to capture images and create animations perhaps by taking on the roles of different characters in a narrative. Some systems have used physical proxy objects to enable collaborative animation creation but this requires use of such proxy objects which is not always intuitive or straightforward for end users and can hinder collaboration where multiple children wish to use the same proxy object. In addition the physical proxy objects are limited in their functionality.

The embodiments described below are not limited to implementations which solve any or all of the disadvantages of known animation creation systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Animation creation is described, for example, to enable children to create, record and play back stories. In an embodiment, one or more children are able to create animation components such as characters and backgrounds using a multi-touch panel display together with an image capture device. For example, a graphical user interface is provided at the multi-touch panel display to enable the animation components to be edited. In an example, children narrate a story whilst manipulating animation components using the multi-touch display panel and the sound and visual display is recorded. In embodiments image analysis is carried out automatically and used to autonomously modify story components during a narration. In examples, various types of hand-held view-finding frames are provided for use with the image capture device. In embodiments saved stories can be restored from memory and retold from any point with different manipulations and narration.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a children's storytelling system, the system described is provided as an example and not a limitation. As those skilled in the art will appreciate, the present examples are suitable for application in a variety of different types of animation systems.

The term "touch panel display" is used to refer to a surface arranged to display digital images electronically and where the surface is also arranged to detect a physical object (such as a stylus, human digit, playing piece, or tagged object such as a puck) which either makes contact with the surface or which is close to but not in actual contact with the surface. The digital images displayed may be of any suitable type such as video, still images, animated pictures, electronic drawings, graphical user interface features, or any other type of digital images. Some examples of touch panel displays have functionality to enable discrimination between events where objects come into contact with the touch panel and events where objects merely come into close adjacency with the touch panel.

The term "multi-touch panel display" is used to refer to a touch panel display which is able to both detect two or more co-occurring physical objects (or parts of the same object) which either make contact with the surface or come close to but do not make actual contact with the surface and discriminate between those two or more physical contacts.

Figure 1:
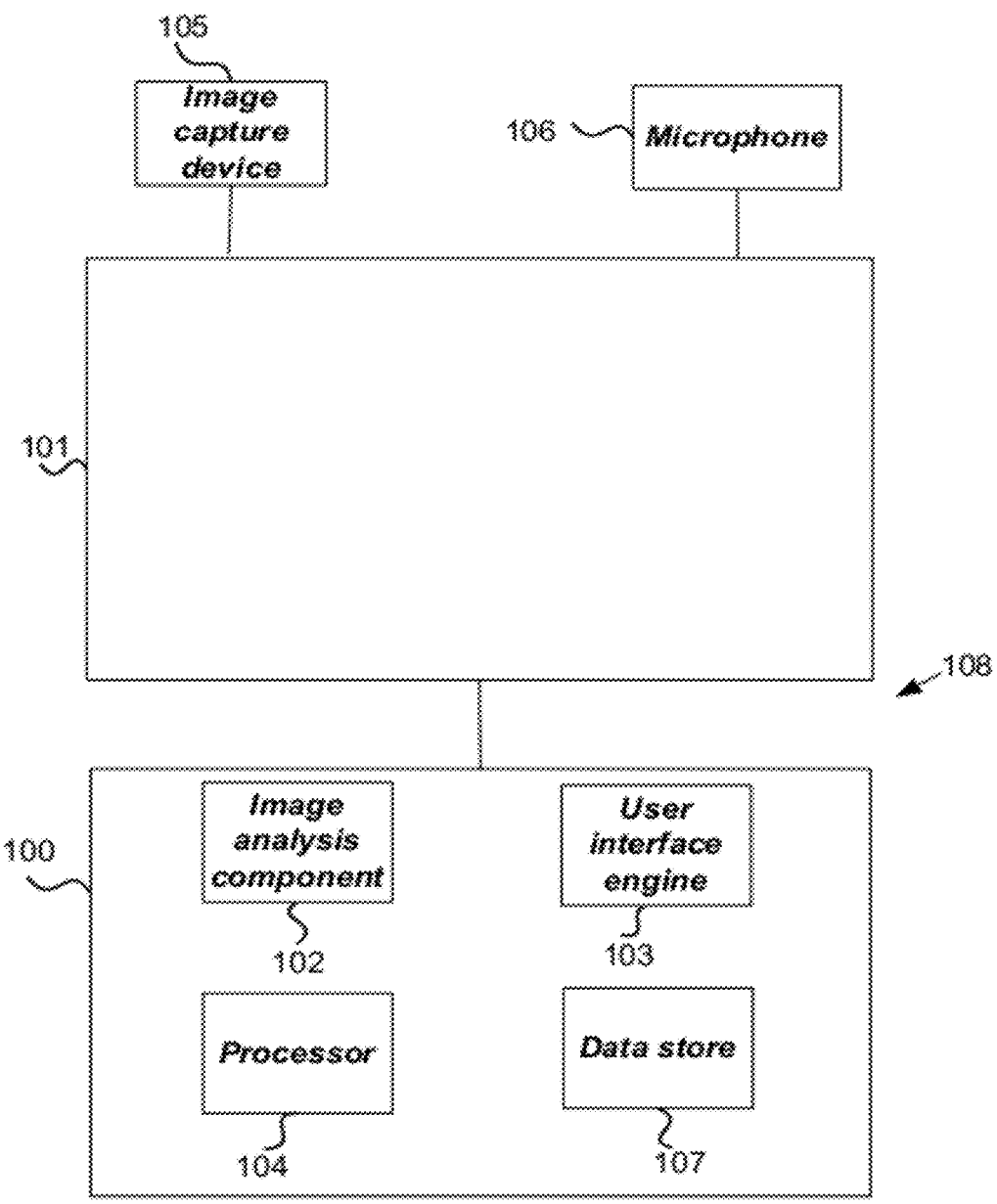
FIG. 1 is an example of an animation creation system.

FIG. 1 shows an example animation creation system 108 comprising a multi-touch panel display 101 which is integral with or in communication with a computing device 100 for controlling the multi-touch panel display. The multi-touch panel display 101 may be planar or non-planar and may be rigid or flexible.

The multi-touch panel display may be of any suitable type. For example, it may be implemented using any suitable technology such as using a surface which is edge lit with a light source, such as near infra-red (IR) LED's such that the light undergoes total internal reflection. For example, the multi-touch panel display may be any suitable type of surface computer such as those currently commercially available.

The animation creation system comprises a processor 104 arranged to control the multi-touch panel display 101 and which itself comprises or is in communication with an image analysis component 102, a user interface engine 103 and a data store 107. The user interface engine 103 is arranged to display a graphical user interface at the multi-touch panel 101. The user may interact with a storytelling environment displayed using the user interface at the multi-touch panel display. The image analysis component is arranged to analyse images captured by the image capture device 105 and/or images created by a user of the multi-touch panel display, for example, by using a drawing facility. The data store 107 is arranged to store images captured by the image capture device as well as animations created by the system, and animation components created by the system 108.

An image capture device 105 is connected to the animation creation system 108 either using a physical connection or by a wireless link or other communications link. The image capture device can be any type of device which can output images in a computer readable form, such as a webcam or video camera. The images captured by the device may be moving image sequences or may be still images. A microphone 106 is provided in communication with the animation creation system. A loudspeaker is also provided in communication with the animation creation system. The microphone and loudspeaker may optionally be provided integral with the image capture device.

The animation creation system provides the ability for one or more users to create an animation from a plurality of animation components. The term "animation component" is used to refer to an image, audio clip, drawing, annotated image, or any object which may be displayed using the animation creation apparatus, or any combination of these items. The animation components may be pre-configured at the animation creation apparatus, they may be received from other entities in communication with the animation creation apparatus, and they may be created by a user of the apparatus. Any combination of these options is also possible.

Figure 2:
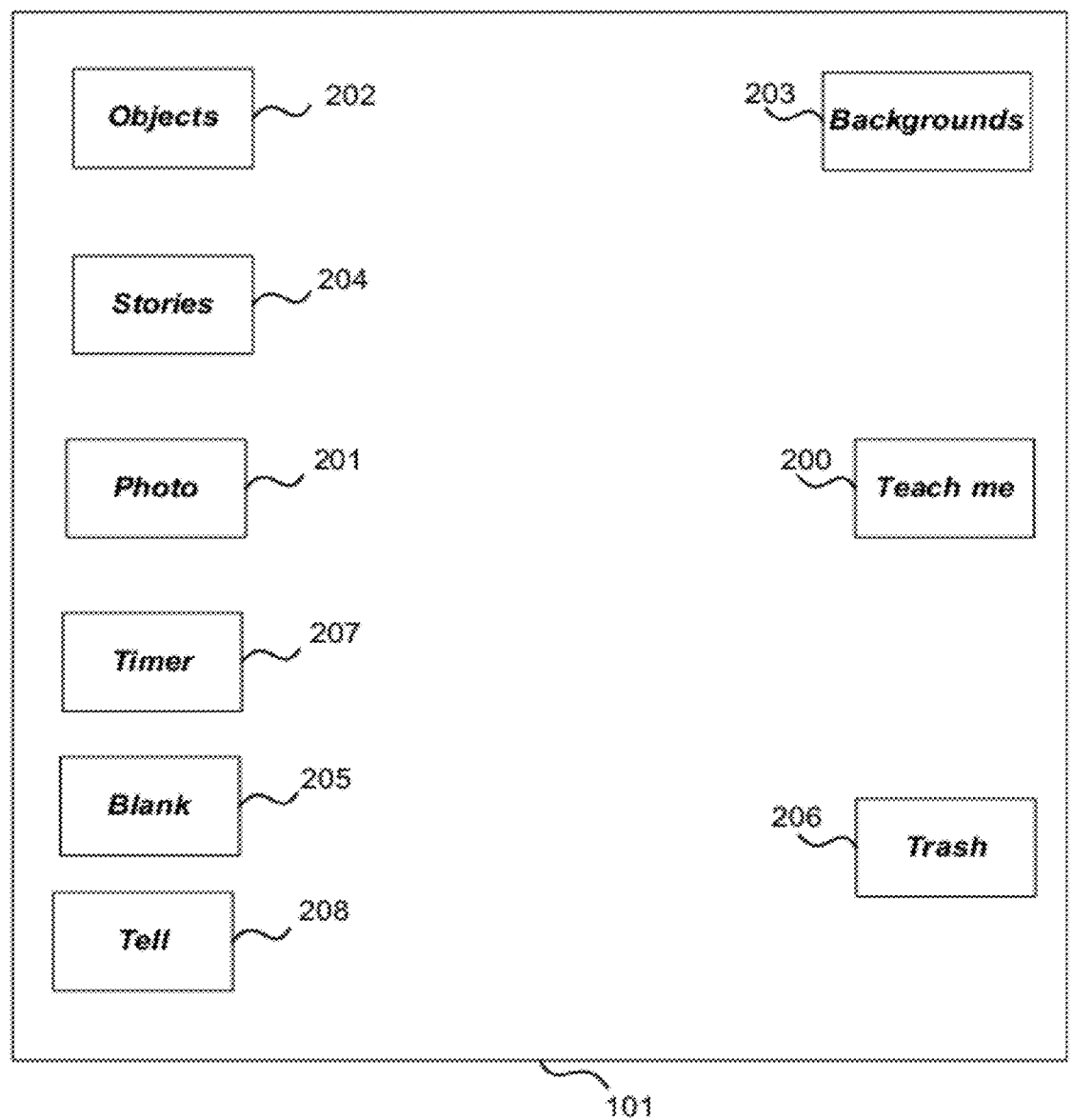
FIG. 2 shows an example of a graphical user interface in 'tell' mode.

FIG. 2 shows an example of a graphical user interface displayed at the multi-touch panel display 101 and provided by the user interface engine 103. The user is presented with a variety of options which can be selected by making user input at the multi-touch panel display. There may be one or more users, described herein using the term 'user'. These options include 'teach me' 200, which allows the user to view an animation explaining how the system works. 'Photo' 201 which allows the user to trigger the image capture device 105 from the GUI. 'Objects' 202 and 'Backgrounds' 203 allow the user to select previously created foreground and background animation components and add them to a current animation, or to store animation components they have created in an archive using a 'drag and drop' method. 'Stories' 204 allows the user an option to replay previously recorded stories from the archive. 'Blank' 205 allows the user to create animation components from scratch using a multi-touch technique which can be finger-painting or similar. The 'trash' option 206 allows users to delete previously created or currently edited animation components by using a 'drag and drop' method to move the animation component to a part of the GUI displaying, for example, a waste-paper basket. The 'timer' option 207 displays a count-down on the GUI prior to activating the image capture device 105, which allows the user a certain amount of time before the image is taken where, for example, they are taking a self portrait. When the user is ready to begin creating their animation they can activate the 'tell' option 208 which gives the option to record their animations.

Figure 3:
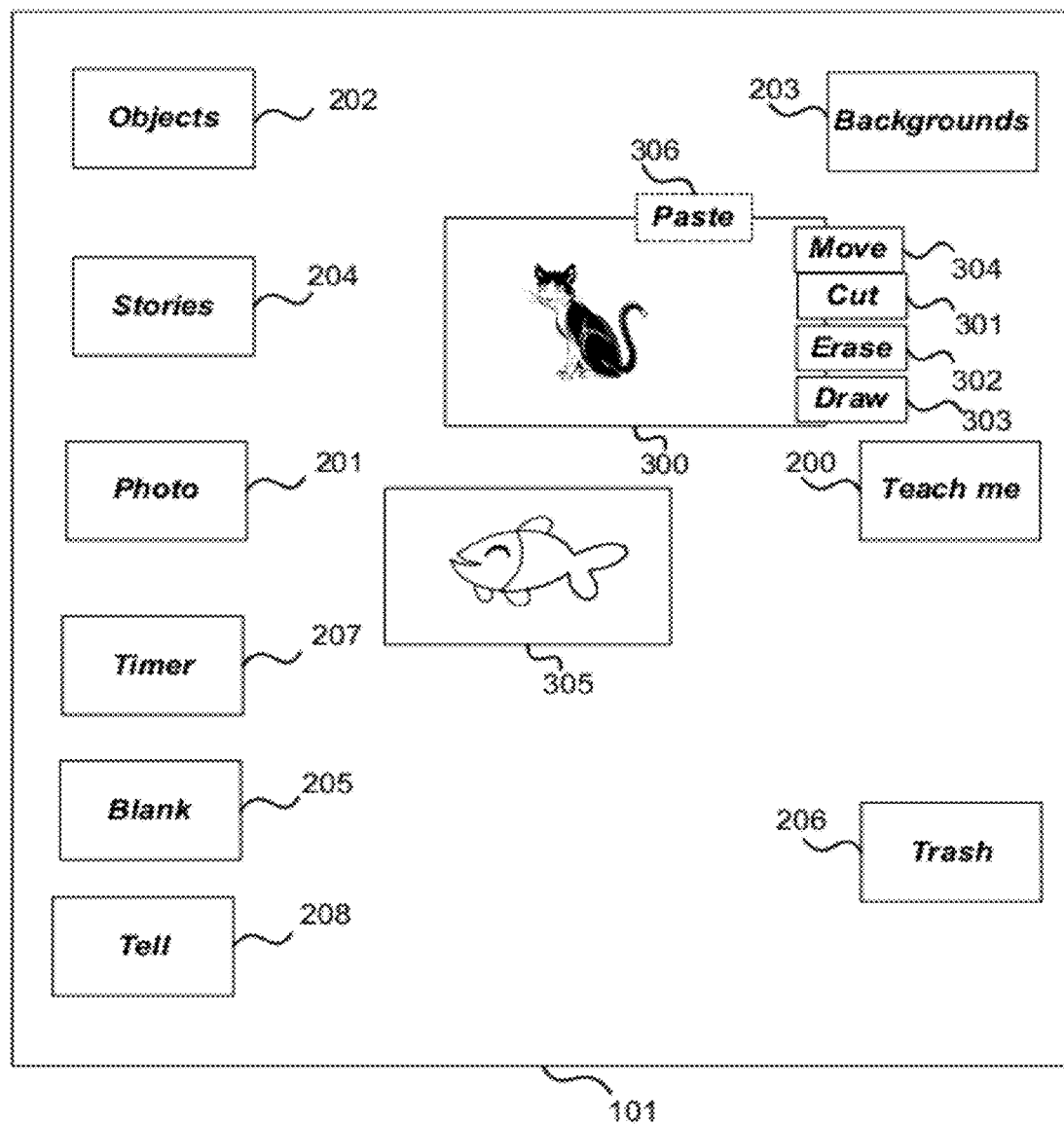
FIG. 3 shows an example of picture editing.

FIG. 3 shows the GUI when an image 300 (such as a digital photograph of a cat in this example) is input from the image capture device 105. When the image 300 is imported by the user into a workspace of the graphical user interface by capturing from the image capture device 105, selecting from the object archive 202, the backgrounds archive 203, or creating from scratch using a blank drawing 205, the user is presented with a number of options to enable them to edit and manipulate the image 300. These include options to 'cut' out 301 a section of the image, 'erase' 302 a section of the image, draw 303 on the image and move 304 the image. When an additional image 305 is added the user has the additional option to 'paste' 306 the two images together. The functions of these options are further described in FIGS. 4 and 5.

Figure 4:
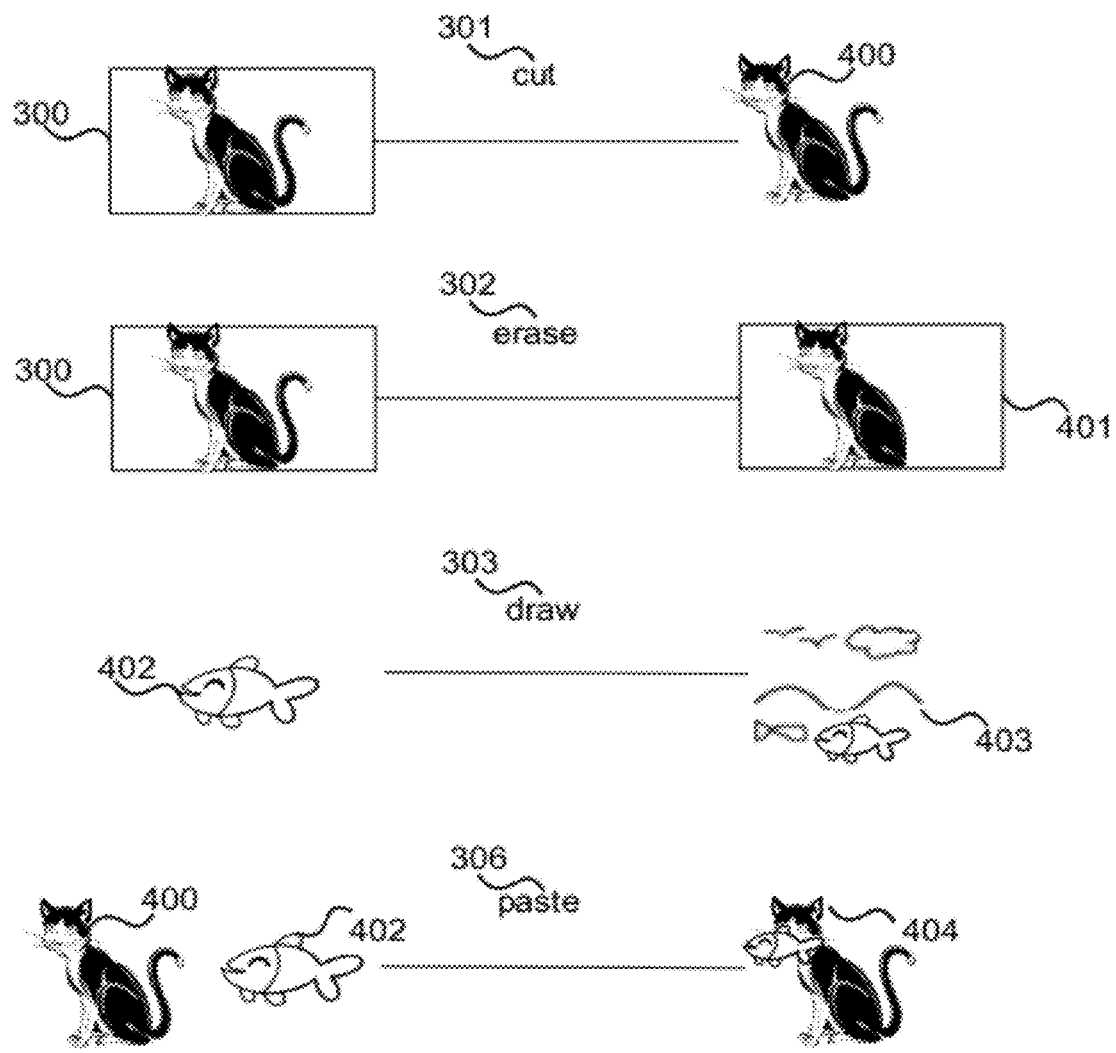
FIG. 4 illustrates example picture editing processes.

FIG. 4 illustrates possible image editing options available to the user. When an image is input from the image capture device 105 it automatically appears on the multi-touch panel display 101 then the user is presented with a variety of options for editing the image as described in FIG. 3 above.

These can include options such as 'cut' 301. When this option is selected by the user the processor 104 is arranged such that a line traced by the user around a portion of the original image 300 detected by the multi-touch panel display delineates a new image 400 with an edge comprising the line traced by the user.

When the 'erase' option 302 is selected then the processor 104 is arranged to allow the user to 'rub-out' part of the image using multi-touch gestures detected at the multi-touch panel display. In the example shown in FIG. 4 a part of the tail of the cat in image 300 is erased to create a new image 401.

When the 'draw' option 303 is selected the processor 104 is arranged so that touch gestures from the user are used to create sketches. These sketches can be combined with an existing image 402 to create a new image 403, or can be drawn onto a blank surface 205 chosen by the user. The user may be able to select from a wide variety of options for the color, thickness and pattern of the lines drawn.

When the 'paste' option 306 is selected by the user two or more images can be combined. The images can be input from the image capture device 105 or restored from the data store 107 using the 'objects' option 202 or 'backgrounds' option 203. The processor 104 is then arranged to recognise that gestures from the user, for example, dragging one image 400 so that it is combined with another image 402, detected by the multi-touch panel display are 'paste' actions and create a new image 404 from the prior images.

Figure 5:
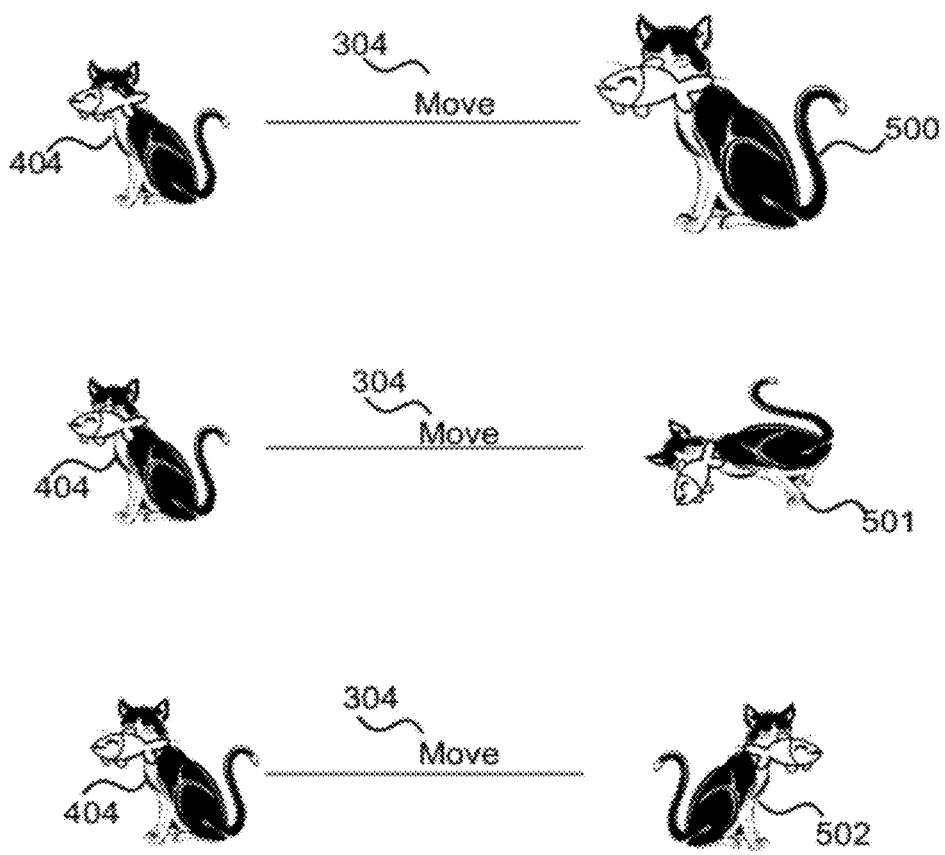
FIG. 5 illustrates image manipulation processes.

FIG. 5 shows options that can be carried out on an image using the 'move' option 304. When this option is selected by the user the processor 104 is arranged to recognise that a number of gestures detected by the multi-touch panel display constitute image manipulation commands. For example, using two fingers to 'pull' an image from opposite corners may constitute a command to resize an image 404 to a larger size 500. A gesture where one side of an image 404 is selected and the user carries out a twisting motion or draws an arc, can be a command to rotate an image 501. A gesture where one side of the image 404 is selected and then moved to the opposite side can be a command to translate an image 502.

When a user has completed any image alteration processes they wish to carry out the image can then be output as an animation component to a data storage device 107 by dragging the image to the 'objects' 202 or 'background' 203 stores.

Figure 6:
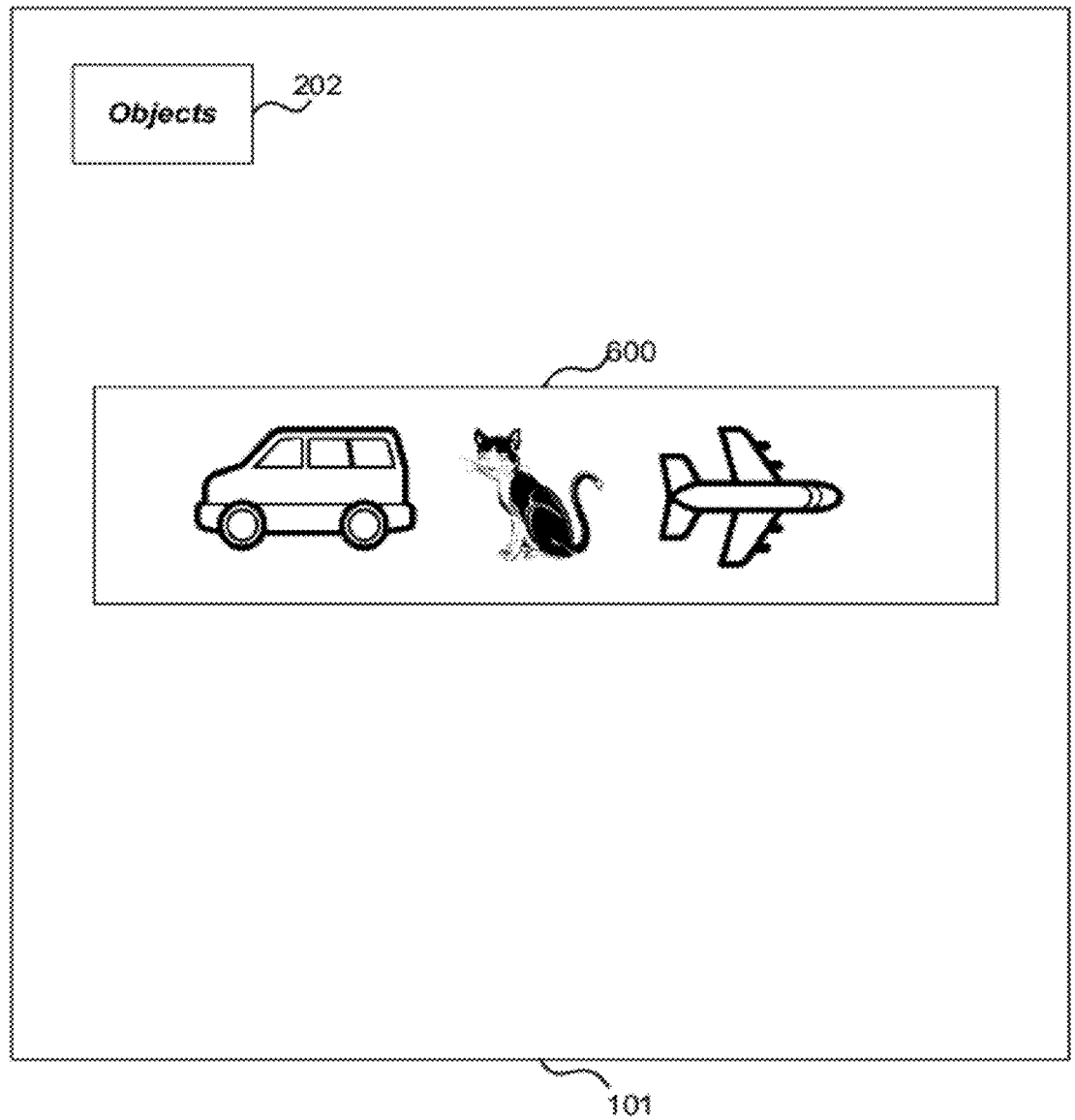
FIG. 6 shows an example of an objects archive being accessed.
Figure 7:
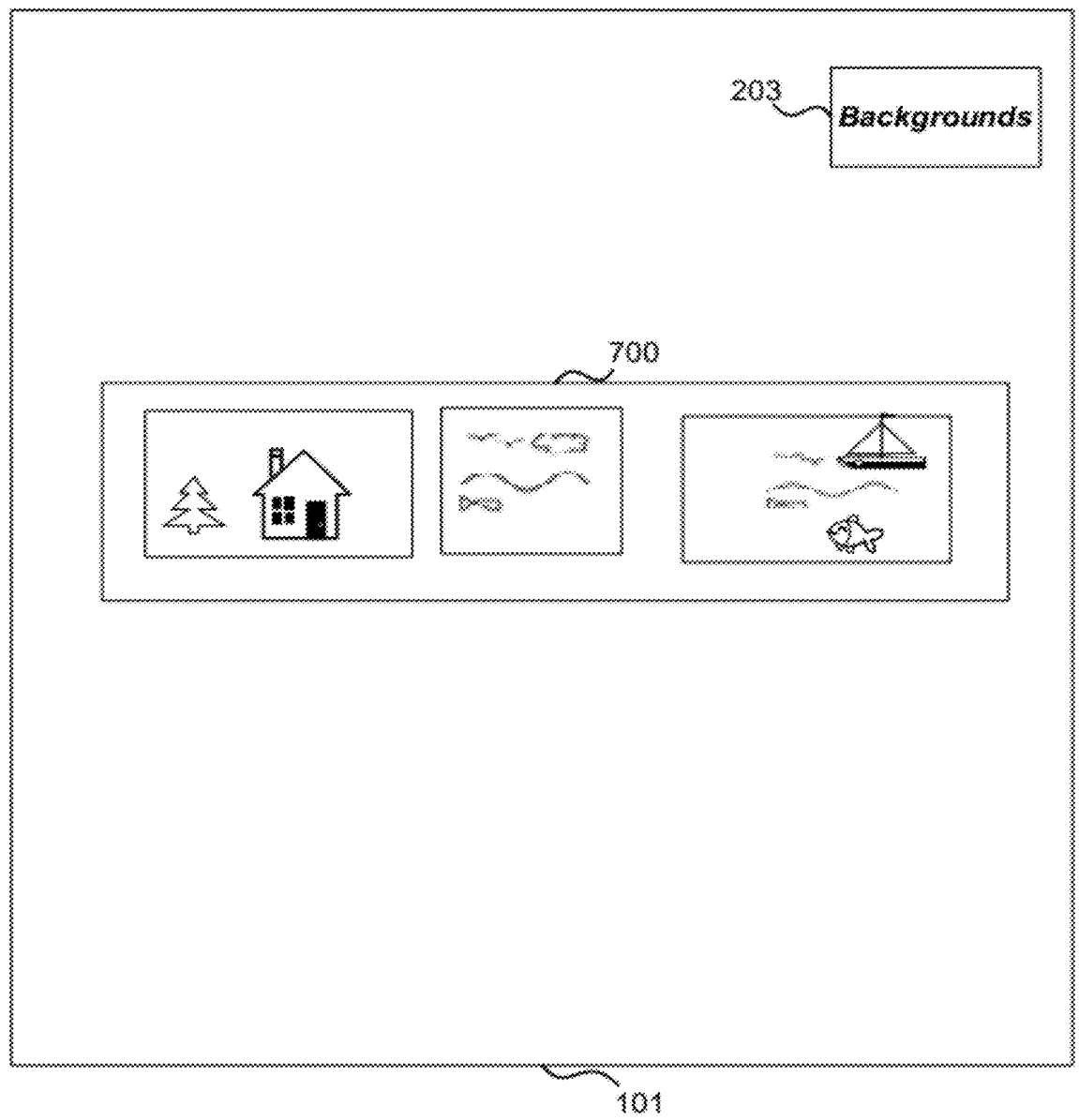
FIG. 7 shows an example of a backgrounds archive being accessed.
Figure 8:
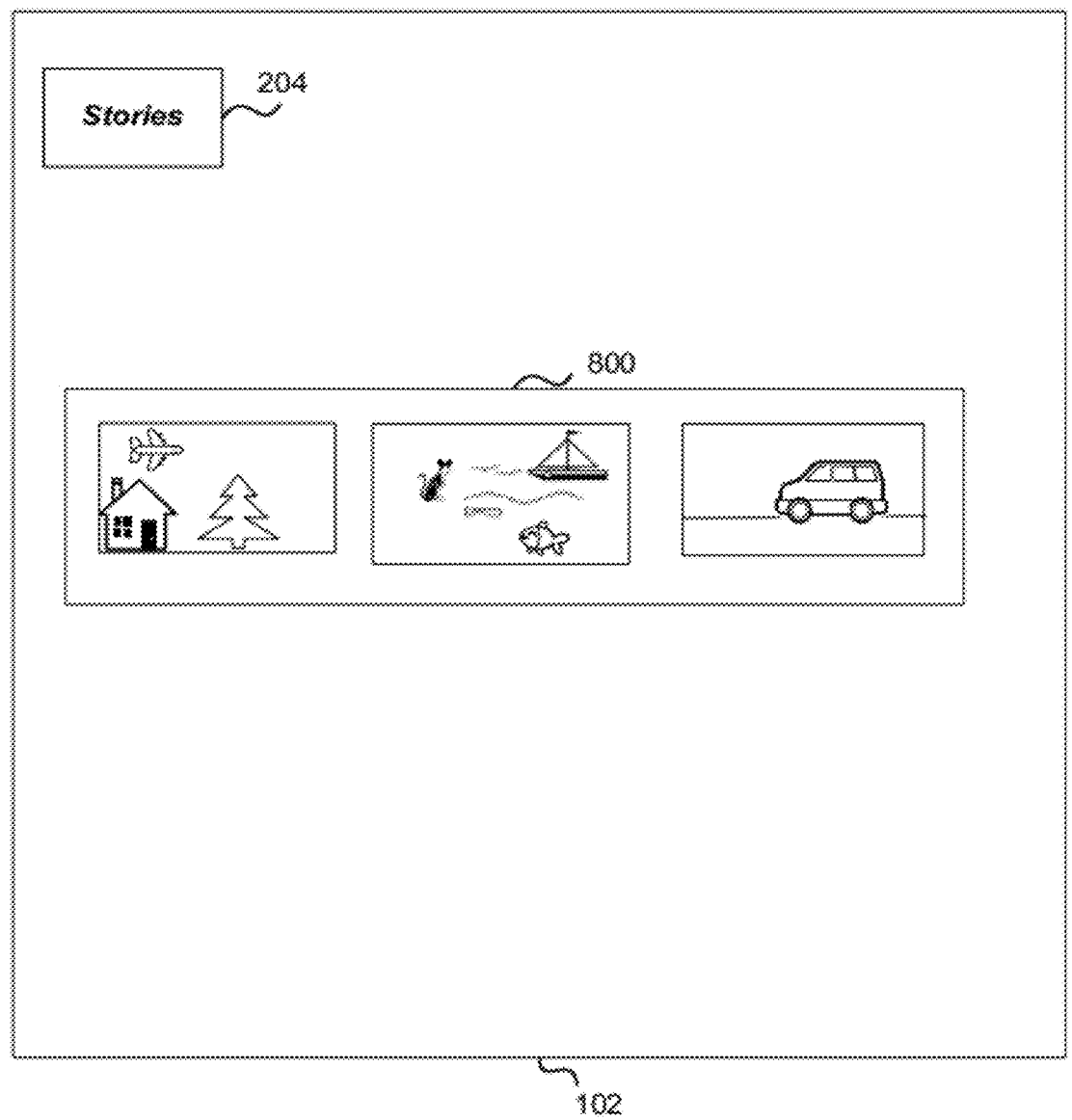
FIG. 8 shows an example of a stories archive being accessed.

FIGS. 6, 7 and 8 illustrate various methods for restoring archived animation components to the GUI to be used in creating an animation.

FIG. 6 illustrates when the 'objects' option 202 is selected by the user. The processor 104 is arranged to display the objects animation components section of the data storage archive 107 on the multi-touch panel display 101. This can be displayed on the GUI in any suitable manner which may be customisable by the user and can include: slideshows, thumbnails and cartoon strips 600. When an object animation component is selected by the user then the object animation component can be edited using the methods described in FIGS. 3-5.

FIG. 7 illustrates when the 'backgrounds' option 203 is selected by the user. The processor 104 is arranged to display the background animation components section of the data storage archive 107 on the multi-touch panel display 101. This can be displayed on the GUI in any suitable manner which may be customisable by the user and can include: slideshows, thumbnails and cartoon strips 700. When a background animation component is selected by the user then the background animation component can then be edited using the methods described in FIGS. 3-5.

FIG. 8 illustrates when the 'stories' option 204 is selected by the user. The processor 104 is arranged to display previously recorded animations stored at the data storage archive 107 on the multi-touch panel display 101. This can be displayed on the GUI in any suitable manner which may be customisable by the user and can include: slideshows, thumbnails, clips and cartoon strips 800. When a story animation is selected by the user then the story can then be replayed by the user using the method described below in FIG. 11 or further edited using the methods described in FIGS. 3-5.

Figure 9:
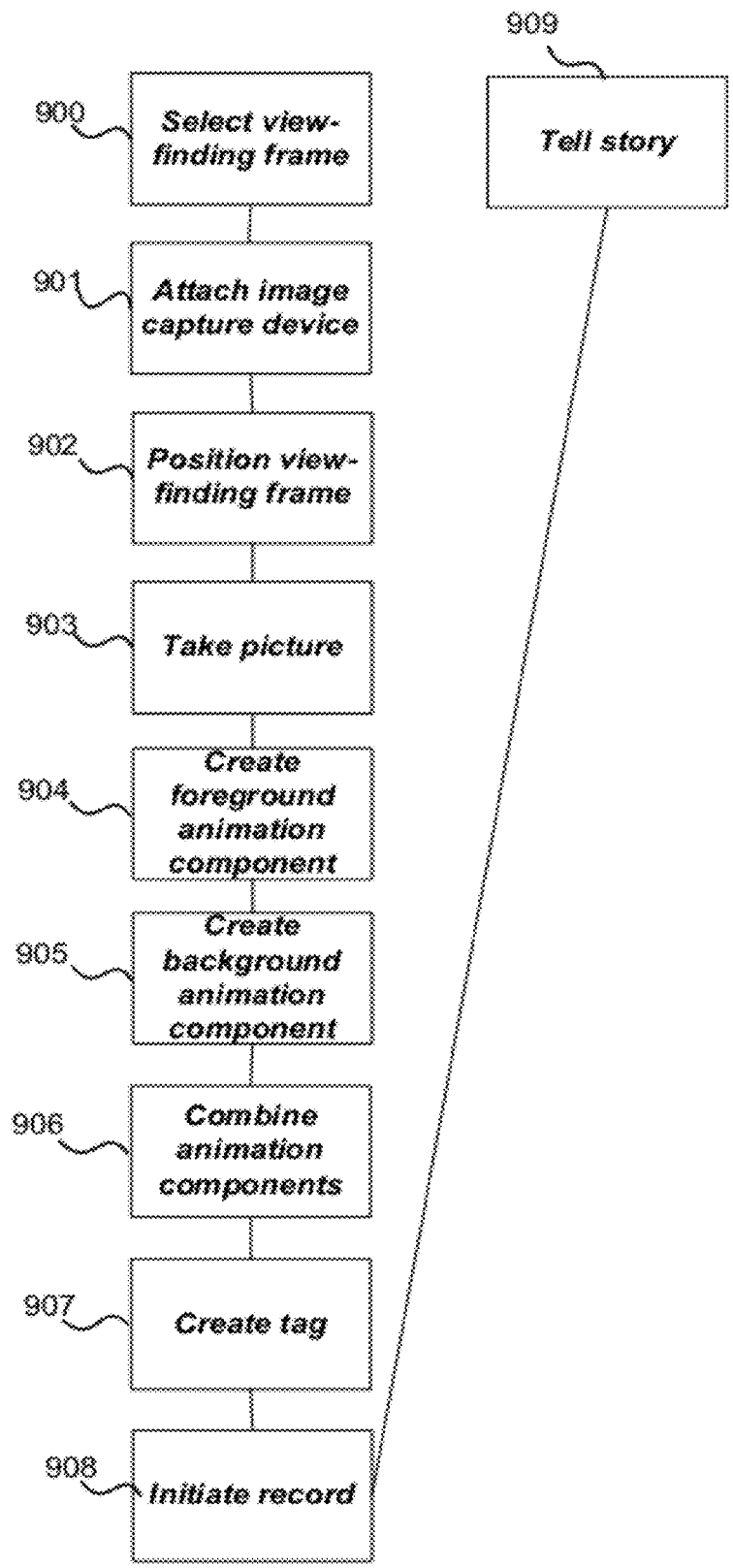
FIG. 9 is a flow diagram of a method carried out at an animation creation system by user(s) in order to record an animation.
Figure 10:
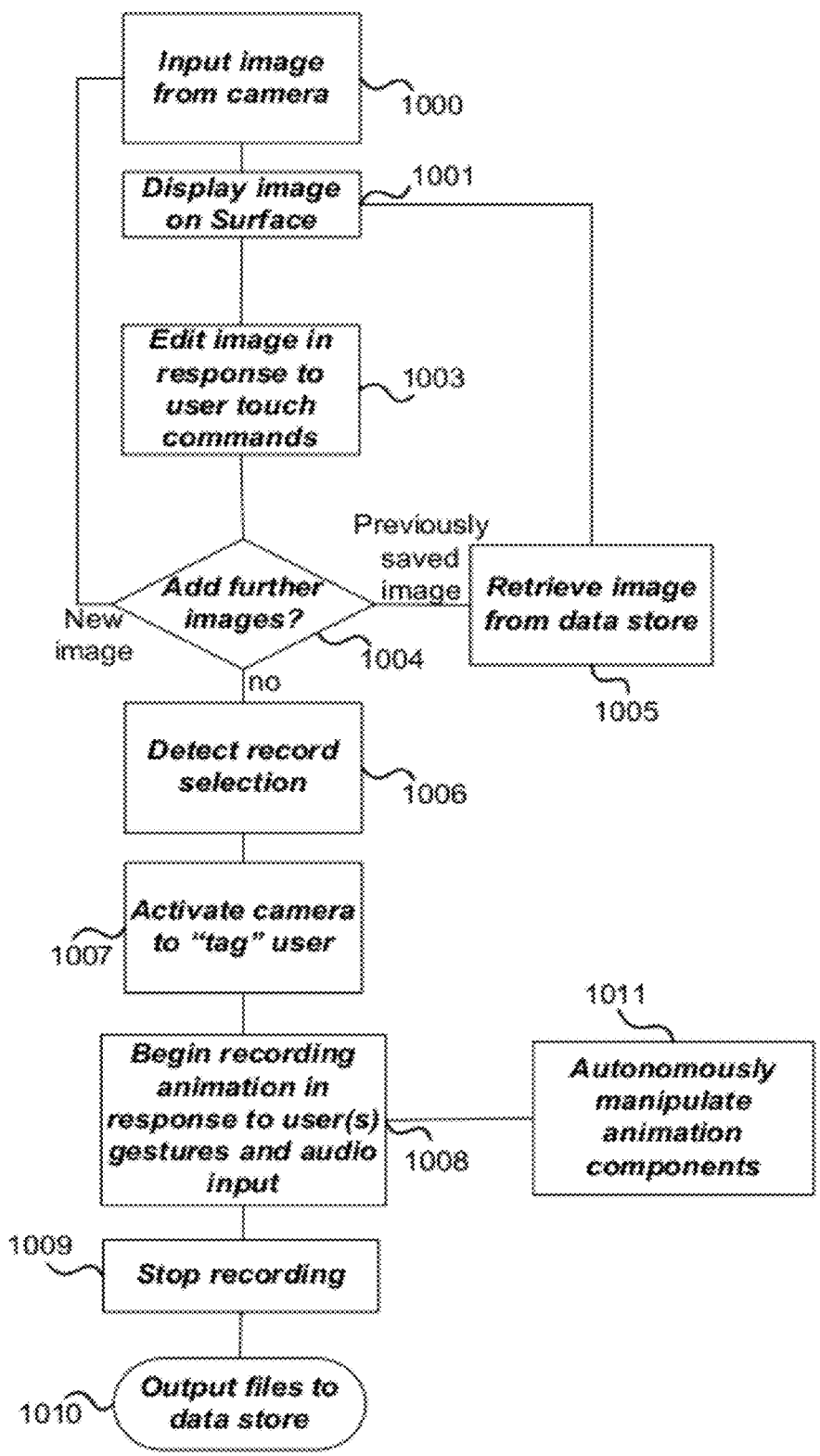
FIG. 10 is a flow diagram of a method carried out by an animation creation system in order to record an animation.

FIGS. 9 and 10 contain flow charts which show methods for creating an animation. In FIG. 9 the user first captures an image. The user optionally selects 900 a hand-held view-finding frame arranged to support the image capture device using a fixing arranged to detachably fix the image capture device to the frame and comprising a view-finding aperture. Examples of view-finding frames are described with reference to FIGS. 13-18 below. The image capture device 104 is attached 901 to the view-finding frame using a fixing on the view-finding frame and image capture device which is of any suitable type. For example, the fixing may comprise magnets, Velcro, clips, brackets or other fixings. A user such as child is easily able to hold the hand-held view finding frame and image capture device and to position 902 the view finding frame in order to capture a desired image. For example, the child is able to look through the aperture of the view finding frame and adjust the position of the frame and image capture device until the scene to be captured is in registration behind the aperture. The child is able to take a picture 903 by operating a button on the view finding frame which triggers the camera. Different types of view finding frame are available depending on the particular type of image to be captured and depending on the number and skill level and preference of the user(s).

The user then creates 904 a foreground animation component. This can be carried out by selecting an image input from the image capture device 105 and optionally performing any of the image alteration options described in FIGS. 3, 4 and 5, and/or by restoring an image from the data store 107 by selecting the 'objects' option 202 as described in FIG. 6 and optionally carrying out any of the image alteration options shown in FIGS. 3, 4 and 5, or by creating an object from scratch using the 'blank' option 205. When the user is satisfied with the foreground animation component they have created the component can then be output to a data store 107 by dragging it to the 'objects' store 202.

The user then creates 905 a background animation component. This can be carried out by selecting the image input from the image capture device 105 and optionally performing any of the image alteration options described in FIGS. 3, 4 and 5, or by restoring an image from the data store 107 by selecting the 'background' option 203 as described in FIG. 6 and optionally carrying out any of the image alteration options shown in FIGS. 3, 4 and 5, or by creating an object from scratch using the 'blank' option 205. When the user is satisfied with the background animation component they have created the component can then be output to a data store by dragging it to the 'background' store 203.

The user can repeat the steps described above several times and in any order to create all the animation components they need.

The user can then combine 906 animation components from the 'object' store 202 and the 'background' store 203 to create the first scene of an animation.

When the user is ready to tell the story they may optionally create 907 an image tag to be linked to the story. This can be an image of the user or any other animation component which will allow the animation to be identified. When the user is ready to record their story they can initiate 908 the process by pressing record.

This will activate the microphone 106 in order to record the user's narrative in the form of an audio file and output any manipulation of the animation components on the multi-touch panel display to the data store in the form of a video file. The user can at any point add further object animation components 202 or change the background 203 when telling 909 the story. During the narration phase one or more users may manipulate display of animation components on the multi-touch panel display. For example, an animation component depicting a fairy tale character may be made to move over a background animation component depicting a woodland path. The fairy tale character may be manipulated such that it skips or jumps, changes in size as it moves along, makes somersaults as it moves along or similar. Simultaneously, other animation components may be independently manipulated by other users or the same user. This enables collaborative animation creation. The animation components may also be autonomously manipulated by the animation creation system without the need for user input. For example, a character may grow in size, change physical appearance as if getting older, emit an audio clip, make a movement or other change in a random fashion or on the basis of rules, criteria, image analysis results or other information available to the animation creation system.

FIG. 10 illustrates a method carried out at an animation system to record a story. An image from an image capture device is input 1000 to the animation creation system. The processor 104 is then arranged to display 1001 the image on the multi-touch panel display in combination with the GUI. In response to user commands the image can be edited 1003 in a variety of ways discussed above. If the user decides to add 1004 further images the processor can perform an instruction to restore 1005 these from a data store or input 1000 further images from the image capture device.

When the 'tell' mode 208 is activated the processor is arranged to display an option to record. The tell mode is discussed further in FIG. 11 below. When the record option is selected 1006 by the user then the image input device is activated in order to record 1007 a 'tag' or identifier for the story. After the tag has been created the system begins recording 1008 and a video file combining an animation created from translation of user gestures into manipulation of the animation components on the surface and audio input from a microphone 106 is created. The processor will continue to output information to a video file until the 'stop' option is selected 1009 by the user. The video file of the animation and narration can then be stored 1010 at the data store for later retrieval and replay. As mentioned above, during the recording phase the animation creation system is arranged to autonomously manipulate 1011 animation components in some situations. For example, an image analysis component 102 may comprise a face detector and/or object recognition engine. The image analysis component is arranged to analyse images captured by the image capture device 105 and or images or drawings created or received at the animation creation system. The results of the image analysis component 102 may be used by the processor 104 to autonomously manipulate animation components which comprise the analysed image. For example, an animation component which is a drawing of a human character may be processed by the image analysis component 102 and found to comprise a face. The processor 104 may then be arranged to change the appearance of the character to make the character appear to grow older during an animation by adding wrinkles and grey hair. An object recognition engine may be used to detect classes of object in the animation components such as buildings, trees, people, sky or other object classes. The processor is then able to manipulate animation components using that object class information.

Figure 11:
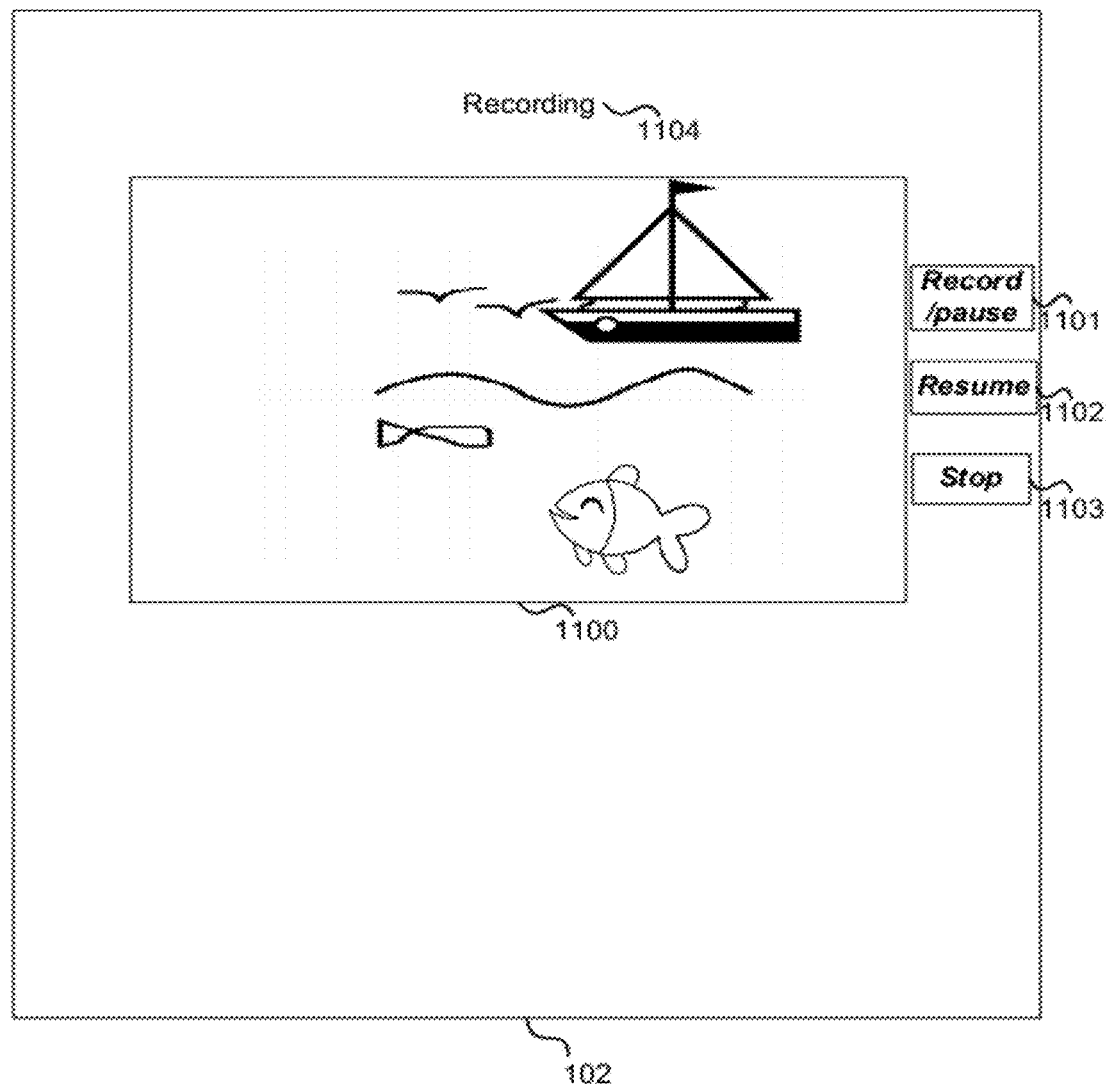
FIG. 11 is an example of a graphical user interface (GUI) in 'tell' mode.

FIG. 11 shows an example of the GUI displayed on the multi-touch panel during 'tell' mode, when a story is being recorded. The foreground and background objects 1100 can be combined and manipulated. A number of options are also shown including record/pause 1101, in the event the recording has been paused a resume option 1102 can also be displayed, and a stop option 1103. When the system is recording this is indicated on the screen 1104. In the example shown the fact that recording is being carried out is indicated by the words 'recording' but this may be indicated by a flashing spot, a light or any other appropriate method.

Figure 12:
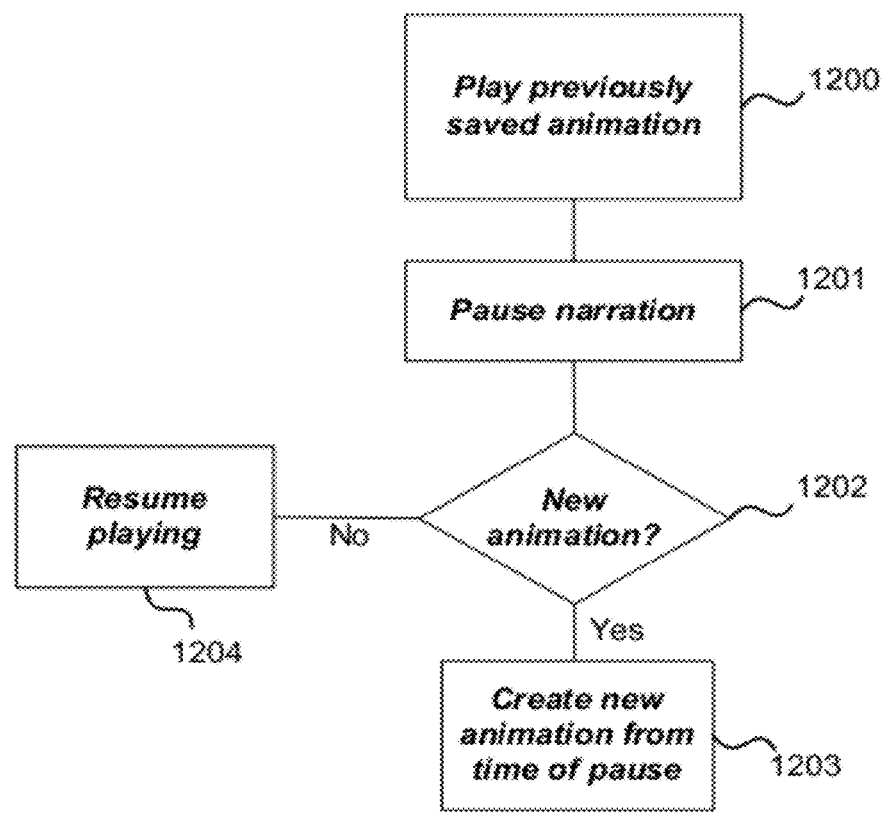
FIG. 12 is a flow diagram of a method carried out at an animation system to replay a stored animation.

In the event a user selects, as described in FIG. 8, a previously saved story then a number of additional steps can be carried out. This is now described with reference to FIG. 12. The animation can be played 1200 and paused 1201 at any point. The user can choose whether or not to create a new animation from the point the previous animation was paused 1202. In the case that the user chooses to create a new animation 1203 all the editing and manipulation steps described in previous FIGS. 3-11 are available to the user. In the event the user decides not to create a new animation but to continue watching the previously stored animation then the animation can be resumed 1204.

In an example storytelling system two children wish to create a story. The first child sketches out a scene on the table with a forest, a river and a dragon. The second child wishes to add a picture of a castle to the scene, she locates a picture stored on the system and uses her fingers to cut out the castle. They wish to add their toys into the narrative so they take pictures of toys and add them into the scene. They can then take snapshots of their own faces and either attach them to other images e.g. a picture of a robot toy taken earlier, or create new bodies from scratch using the draw functions. Using their fingers and hands they manipulate the characters to act out a story while recording their voices to create a narrative and conversations between the characters. The story is then output to a data store by the system allowing it to be replayed later.

In a further example a grandmother has a large collection of objects that are meaningful to the family. She takes a picture of an object and narrates a story about how the object was obtained. She adds in photos and videos relating to the object from folders stored on the data storage device. Her voice is captured, along with an image of the object and any operations she has performed on the surface during the recording. When family members and visitors drop by they can listen and contribute by adding parts to the story.

In a still further example product designers can capture an image of a product they are developing. They can add further images of different versions or different aspects of the product. They can work collaboratively to manipulate or alter the designs using the features described herein. They can capture comments about the design or design scenarios as well as discussion about problems and solutions and output these to the data store for later replay and editing as the product evolves.

In the examples described herein the storytelling process is linked to the physical world by the use of the image capture device and directness of user interaction is provided through the use of the multi-touch panel display and view-finding frames. It is not necessary for users to be able to operate a standard computer. Also, there is no reliance on existing physical toys or physical proxies which prevent the user from taking advantage of all the resources available within the digital world scenario and limit the amount of fine level control and customization of the appearance and behaviour of the narration.

Figure 13:
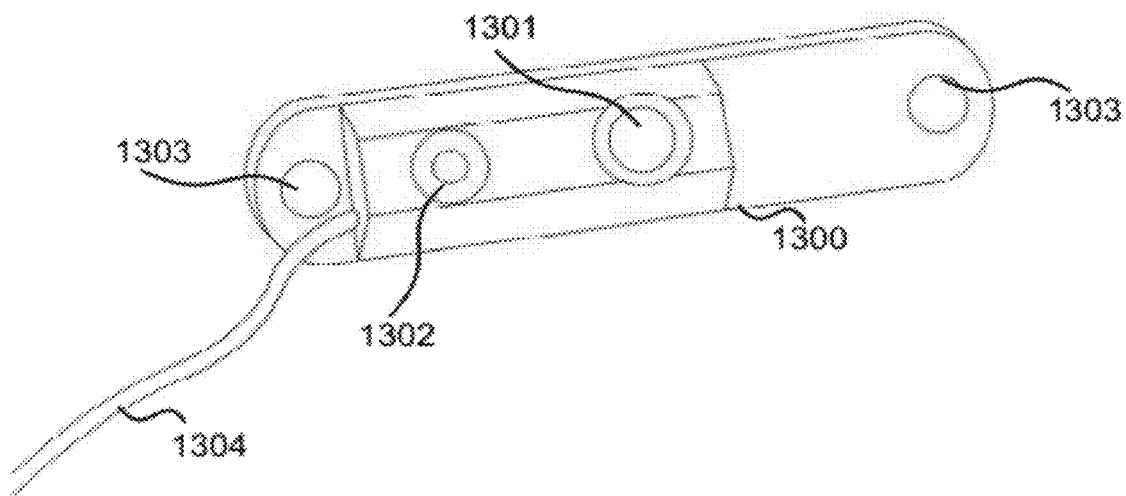
FIG. 13 shows an exemplary image capture device with part of its housing omitted to show internal components.

An exemplary image capture device is now described with reference to FIG. 13. The image capture device 1300 may optionally be connected to any of the hand held view-finding frames described with reference to FIGS. 14-18. The image capture device 1300 comprises a camera 1301 and optionally a microphone 1302 which may or may not be used. The image capture device 1300 comprises a system of magnets 1303. The magnets allow the camera to be connected to a circuit allowing the image capture device to be triggered using a button or buttons on a viewfinding frame. The magnets may also provide a fixing to enable the camera to be fixed to and supported by a view finding frame. The image capture device is in communication with the animation creation apparatus. In this is example the method of communication is a USB cable 1304 but the method of communication can be any wired or wireless communication.

Figure 14:
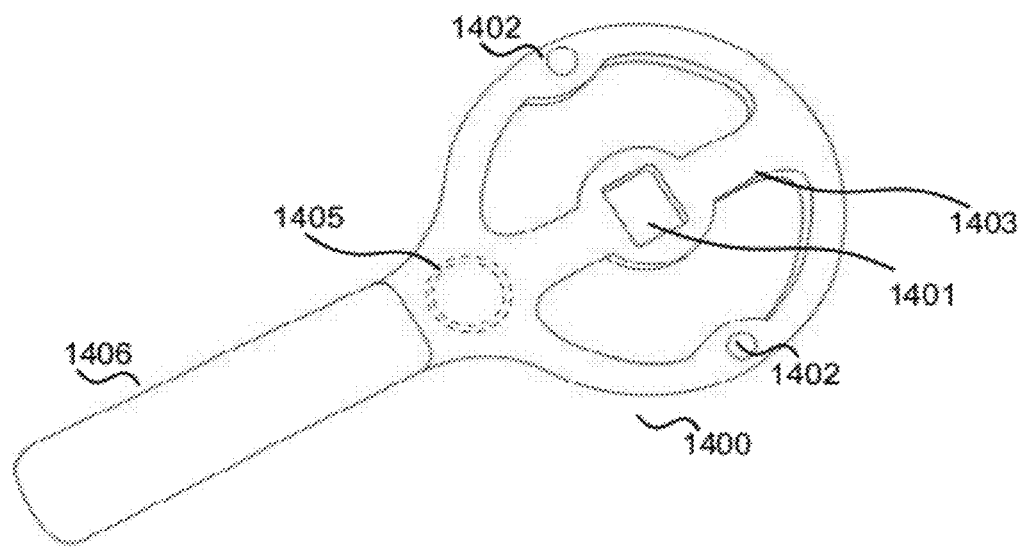
FIG. 14 shows a view-finding frame with and without an attached image capture device.
Figure 14:
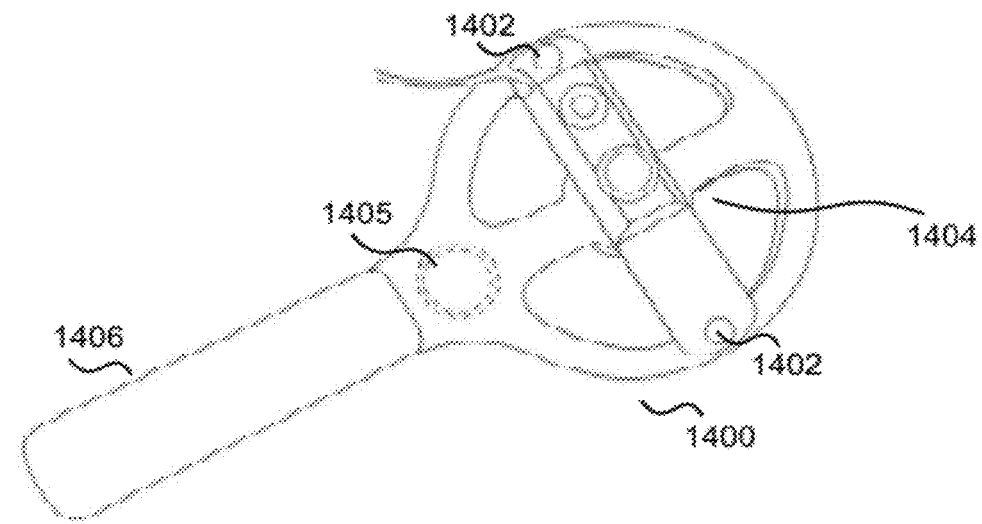

FIG. 14 shows an example cross-hairs view-finding frame 1400 which the image capture device can be attached to. The cross-hairs view-finding frame 1400 can be constructed from wood, plastic, metal or any other suitable material which is lightweight, robust, able to support the camera and suitable for use by children. The frame 1400 comprises a view-finding aperture 1401, which indicates whether the device is being held in a portrait or landscape position. A system of magnets 1402 allows the image capture device to be attached to the frame. When attached the image capture device 1300 forms a cross-hair with a central crosspiece 1403. A circuit connected to the magnets allows the image capture device to be activated by pressing a button 1405 on the cross-hairs viewfinder 1400. The cross-hairs viewfinder also comprises of a grip or handle 1406 to allow the user to hold the object and line up the image which is to be taken. The button may be positioned in relation to the handle such that, in use, the frame may be held and the image capture device actuated, with one hand. By using a view finding frame as described herein the computational function of the camera is made independent of the actuation mechanism for that camera. This enables the user experience to be changed easily by using different types of view finding frame without the need to change the camera itself (either for a different camera or by selecting options at the camera).

Figure 15:
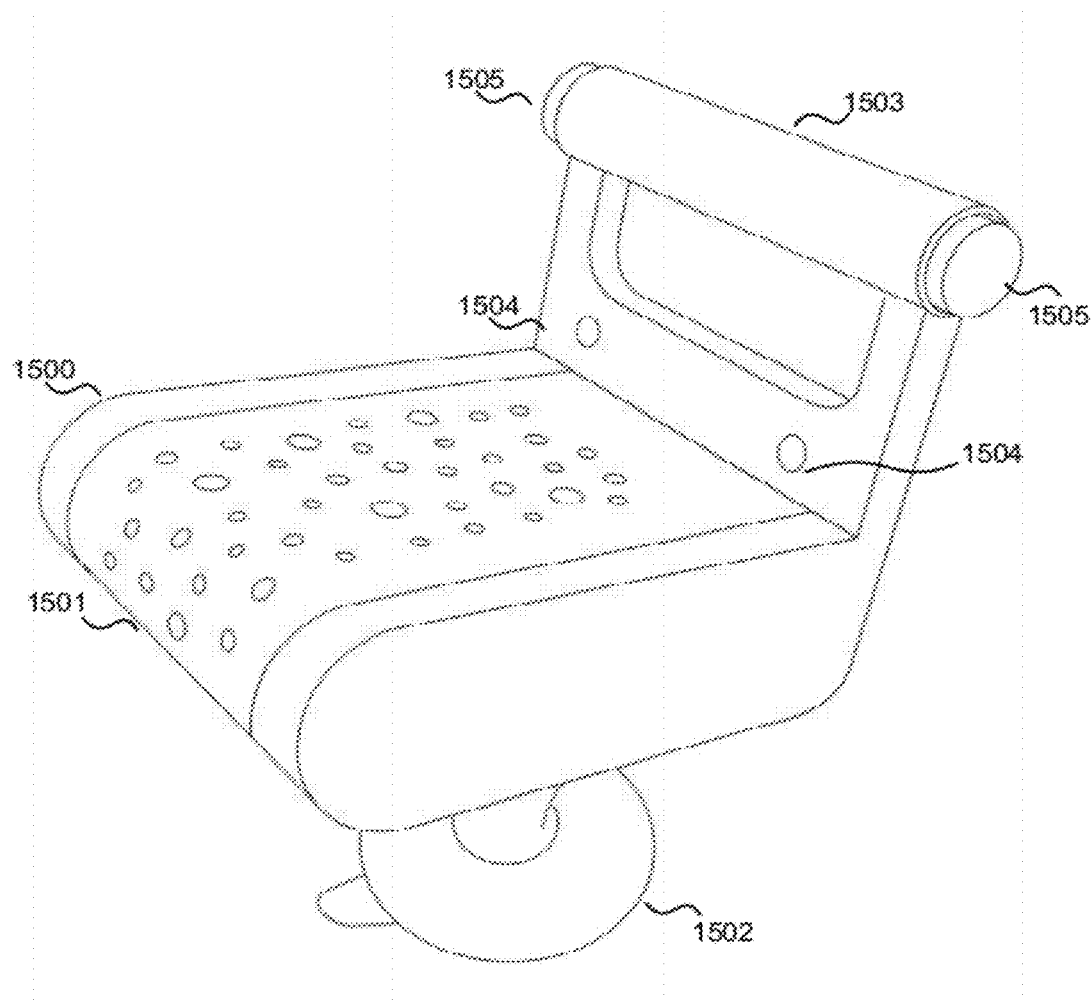
FIG. 15 shows an exemplary speaker/microphone.

FIG. 15 shows an example of a speaker/microphone device 1500. The device consists of an internal speaker/microphone, which may be any system known in the art, situated within a perforated covering 1501. The speaker/microphone system can be attached to the multi-touch panel display 101 or another object using a suction cup 1502 or other attaching device. The speaker/microphone device 1500 also has a handle or grip 1503 for manoeuvring the device. The speaker microphone system has a system of magnets 1504 to which the image capture device 1300 can be attached. The magnets are connected by a circuit to a button or buttons 1505 which allows the image capture device to be activated. The speaker/microphone device 1500 can be constructed from wood, plastic, metal or any other suitable material. The buttons 1505 may have different capturing settings such as immediate capture or delayed capture or capture at a specified time.

Figure 16:
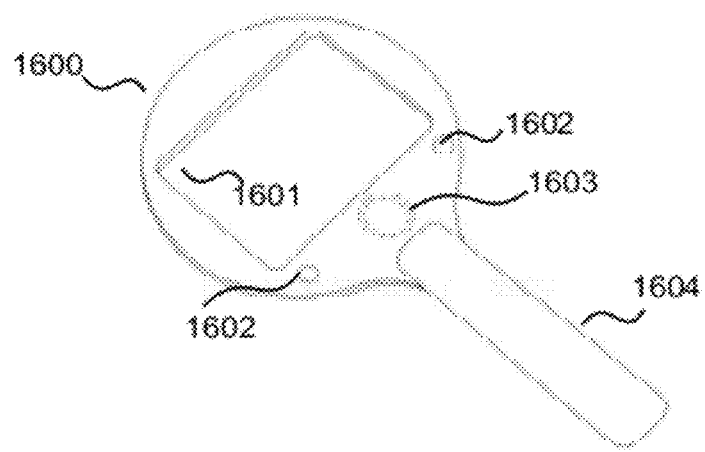
FIG. 16 shows a view-finding frame in the form of a magnifying glass.

FIG. 16 shows a view-finding frame 1600 in the form of a "magnifying glass". It comprises a generally circular frame with a rectangular view finding aperture 1601 which can be looked through to frame the image. A system of magnets 1602 is provided which allows the image capture device to be attached to the frame. The magnets may be provided at any suitable location on the frame which enables the camera to be fixed to the frame depending on the shape, size, type and weight of the camera being used and on the required characteristics of the images to be captured. The magnets may be connected by a circuit to a button 1603 located below the aperture and adjacent to a handle 1604. The button allows the image capture device to be activated when the button is pressed. The frame also comprises a handle or grip 1604 allowing the user to hold the frame. The magnifying glass frame 1600 can be constructed from wood, plastic, metal or any other suitable material.

Figure 17:
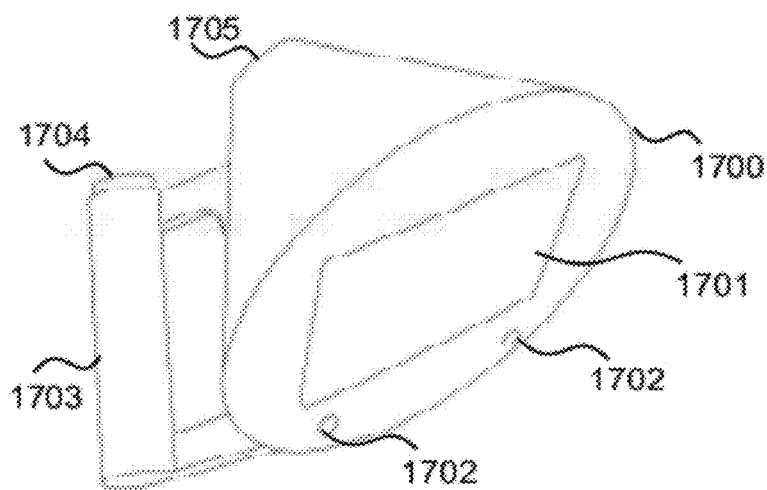
FIG. 17 shows a view-finding frame in the form of a "telescope"

FIG. 17 shows a view finding frame 1705 which has a generally conical form intended to represent a telescope. The frame 1705 may be constructed from wood, plastic, metal or any other suitable material. View-finding apertures are situated at both the base 1701 and the apex 1705 of the conical frame allowing the frame to be looked through. The frame has a system of magnets 1702 as in the other view finding frames described above. The telescope frame also comprises a handle or grip 1703 allowing the user to hold the object and a button 1704 for actuating the image capture device.

Figure 18:
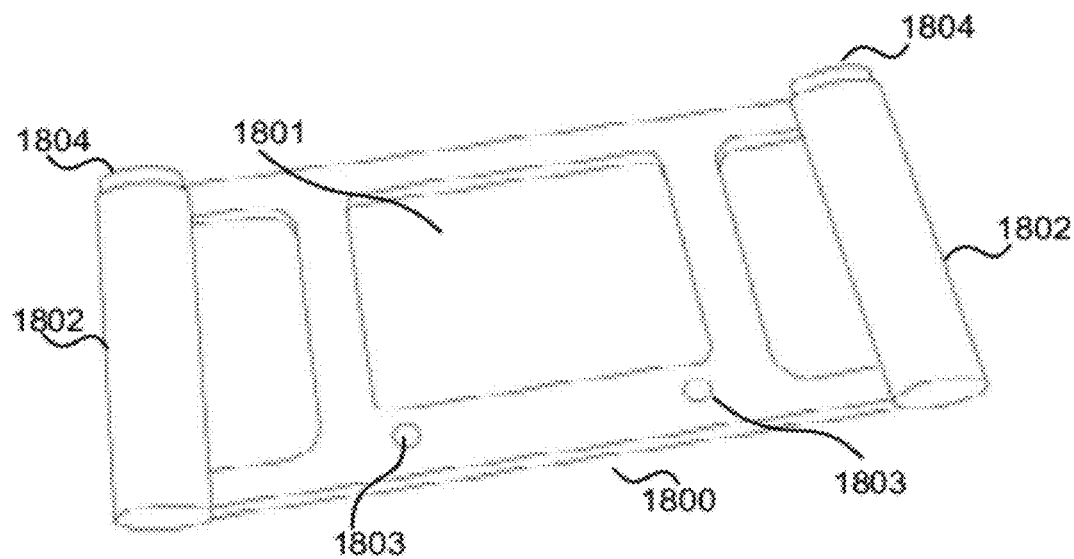
FIG. 18 shows another example of a view-finding frame.

FIG. 18 illustrates a view finding frame suitable for use by a plurality of users at the same time. The frame 1800 is sized and shaped to allow two or more users to frame an image. The frame can be constructed from wood, plastic, metal or any other suitable material. The frame comprises a rectangular aperture 1801 which a plurality of users is able to look through. Two handles 1802 are provided parallel with sides of the rectangular aperture allowing a plurality of users to hold the object. A system of magnets is provided 1803 which allows the image capture device to be attached to the viewfinder object. The magnets are connected by a circuit to one or more buttons 1804 which allow the plurality of users to activate the image capture to device. The buttons 1804 are located at the tops of the handles for ease of operation. As mentioned above, the buttons may provide different capturing settings such as countdown to capture or immediate capture. When the image capture device is attached to one of the devices described above it can indicate to the system that a particular effect should be applied to the captured image depending on the type of view-finding frame being used. For example, when the image capture device is attached to the "magnifying glass" view-finding frame 1600 it can indicate to the system to apply a vignette effect. In another example, when the image capture device is attached to the "telescope" frame 1700 it can indicate to the system to zoom the image. In order to achieve this the frame may comprise an identifier and the image capture device may be arranged to associate the identifier with the images of animation components. For example, the identifier may be a signal received at the animation creation apparatus when a connection is established between the image capture device and the animation creation apparatus. The processor 104 may be arranged to modify images received from the image capture device 105 on the basis of the view-finding frame identifiers.

The objects described in FIGS. 14-18 are described as examples and not limitations. As a reader skilled in the art will recognise there are a variety of ways of implementing viewfinding frames.

Figure 19:
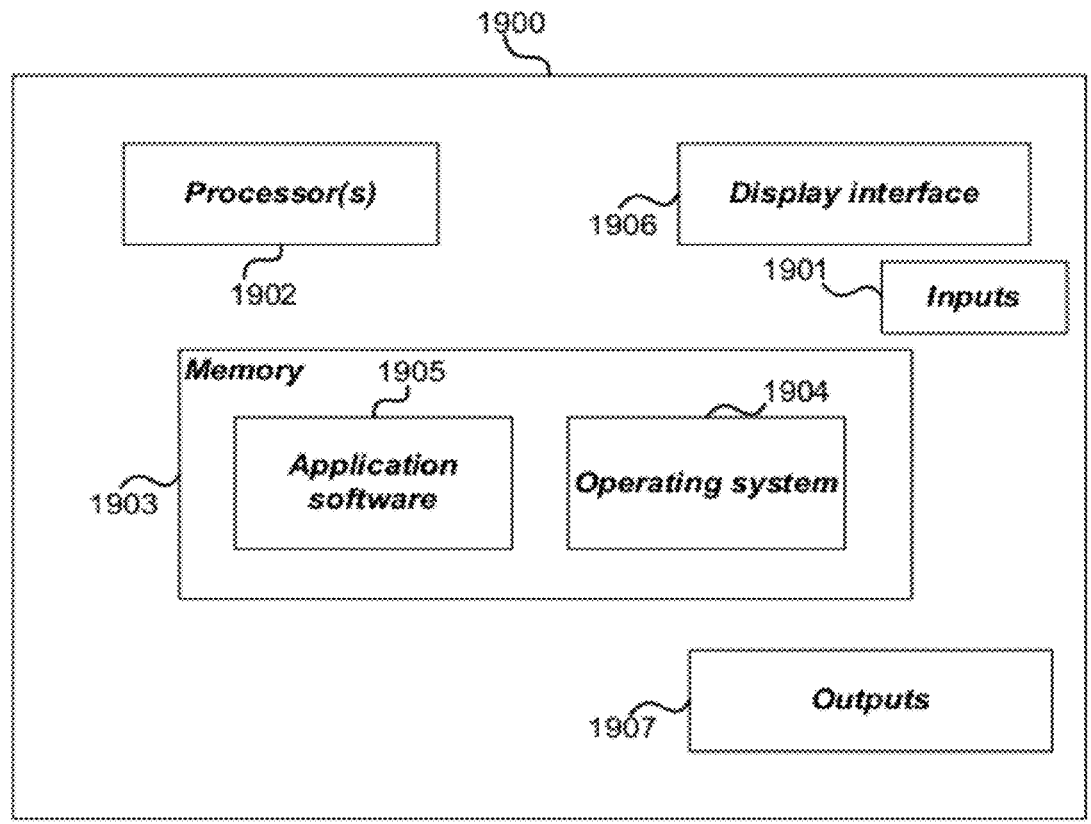
FIG. 19 shows an exemplary computing based device in which a surface based storytelling system may be implemented.

FIG. 19 illustrates various components of an exemplary computing based device 1900 which may be implemented as any form of computing and/or electronic device, and in which embodiments of an animation creation system may be implemented.

The computing-based device 1900 comprises one or more inputs 1901 which are of any suitable type for receiving media content, Internet Protocol (IP) input, images, videos, animation components etc. Computing-based device 1900 also comprises one or more processors 1902 which may be microprocessors, controllers or any other suitable type of processors for processing computing executable instructions to control the operation of the device in order to enable animation creation. Platform software comprising an operating system 1904 or any other suitable platform software may be provided at the computing-based device to enable application software 1905 to be executed on the device.

The computer executable instructions may be provided using any computer-readable media, such as memory 1903. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1907 is also provided such as an audio and/or video output to a display system integral with or in communication with the computing-based device. A display interface 1906 may be provided to control a multi-touch panel display. The display interface may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An animation creation apparatus comprising:
a multi-touch panel display;
a processor arranged to control the multi-touch panel display;
an image capture device in communication with the processor and arranged to capture images of animation components;
a memory arranged to store animation components;
a microphone in communication with the processor and arranged to capture sound during an animation narration;
a user interface engine arranged to control the multi-touch panel display such that, during the animation narration, user input received from a plurality of users via the multi-touch panel display is used to manipulate presentation of at least one of the animation components at the multi-touch panel display;
the processor being arranged to store in the memory an animation comprising the sound captured during an animation narration and the display of animation components at the multi-touch panel display during that animation narration;
a hand-held view-finding frame arranged to support the image capture device using a fixing arranged to detachably fix the image capture device to the frame, the frame comprising:
a view-finding aperture; and
an identifier,
wherein the image capture device is arranged to associate the identifier with the images of animation components.

2. An apparatus as claimed in claim 1 wherein the memory is arranged to store animation components selected from any of: images of objects; images of environments, sequences of images of objects, sequences of images of environments.

3. An apparatus as claimed in claim 1 wherein the user interface engine is arranged to provide simultaneous independent control of a plurality of animation components.

4. An apparatus as claimed in claim 1 wherein the processor is arranged to autonomously manipulate at least one of the animation components during an animation narration.

5. An apparatus as claimed in claim 4 wherein the processor comprises an image analysis component arranged to analyse the animation components and wherein the processor is arranged to carry out the autonomous manipulation on the basis of that image analysis.

6. An apparatus as claimed in claim 5 wherein the image analysis component is selected from any of: face detector; object recognition engine.

7. An apparatus as claimed in claim 1 wherein the fixing is positioned on the frame with respect to the view-finding aperture such that in use, when the image capture device is fixed to the fixing, the image capture device captures images of a scene depicted from a view point substantially in registration with the aperture.

8. An apparatus as claimed in claim 1 wherein the frame comprises at least one button arranged to actuate the image capture device and at least one handle for holding the frame.

9. An apparatus as claimed in claim 8 wherein the at least one button is positioned in relation to the handle such that, in use, the at least one frame may be held and the image capture device actuated, with one hand.

10. An apparatus as claimed in claim 1 wherein the processor is arranged to modify images of animation components on the basis of the associated identifier.

11. An apparatus as claimed in claim 1 wherein the view-finding aperture is rectangular and the frame comprises two handles substantially parallel to one another and positioned on opposite sides of the aperture and wherein the frame and aperture are sized and shaped to enable a plurality of users to operate it together.

12. An apparatus as claimed in claim 1 wherein the frame comprises a substantially circular disk, and a handle extending radially from an edge of the circular disk and wherein the processor is arranged to magnify at least parts of the images captured by the image capture device in a manner indicative of a magnifying glass.

13. An apparatus as claimed in claim 1 wherein the frame is substantially in the shape of a cone and wherein the processor is arranged to zoom at least parts of the images captured by the image capture device in a manner indicative of a telescope.

14. An apparatus as claimed in claim 1 wherein the frame comprises a housing holding the microphone and a support for mounting the frame on a surface.

15. An animation creation apparatus comprising:
a multi-touch panel display;
a processor arranged to control the multi-touch panel display;
an image capture device in communication with the multi-touch panel display and arranged to capture images of animation components;
a memory arranged to store animation components;
a microphone in communication with the multi-touch panel display and arranged to capture sound during an animation narration;
a user interface engine arranged to control the multi-touch panel display such that, during the animation narration, user input received from a plurality of users via the multi-touch panel display is used to manipulate at least one of the animation components;
the processor being arranged to store at the memory an animation comprising the sound captured during an animation narration and the display of animation components at the multi-touch panel display during that animation narration;
a hand-held view-finding frame arranged to support the image capture device using a fixing arranged to detachably fix the image capture device to the frame, the frame comprising:
a view-finding aperture; and
an identifier, and
wherein the processor is further arranged to modify the images of animation components on the basis of an associated identifier.

16. An apparatus as claimed in claim 15 wherein the image capture device is arranged to associate the identifier with the images of animation components.

17. A method of creating an animation comprising the steps of:
using an image capture device to capture images of animation components;
storing the animation components at a memory;
using a microphone in communication with a processor to capture sound during an animation narration;
using a user interface engine to control a multi-touch panel display such that, during the animation narration, user input received from a plurality of users via the multi-touch panel display is used to independently manipulate presentation of a plurality of the animation components at the multi-touch panel display;
using the processor to store at the memory an animation comprising the sound captured during an animation narration and the display of animation components at the multi-touch panel display during that animation narration;
using a hand-held view-finding frame to support the image capture device using a fixing arranged to detachably fix the image capture device to the frame, the frame comprising a view-finding aperture, and an identifier; and
associating the identifier with the images of animation components.

18. A method as claimed in claim 17 further comprising modifying the images of animation components on the basis of the associated identifier.

* * * * *